(12) United States Patent
Beuterbaugh et al.

(10) Patent No.: US 9,688,900 B2
(45) Date of Patent: Jun. 27, 2017

(54) METHODS AND SYSTEMS FOR SEQUESTERING CARBON DIOXIDE IN A SUBTERRANEAN FORMATION

(71) Applicant: Halliburton Energy Services, Inc., Houston, TX (US)

(72) Inventors: Aaron Michael Beuterbaugh, Spring, TX (US); Enrique Antonio Reyes, Tomball, TX (US); Alyssa Lynn Smith, Humble, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 390 days.

(21) Appl. No.: 14/366,384

(22) PCT Filed: Aug. 20, 2013

(86) PCT No.: PCT/US2013/055772
§ 371 (c)(1),
(2) Date: Jun. 18, 2014

(87) PCT Pub. No.: WO2015/026328
PCT Pub. Date: Feb. 26, 2015

(65) Prior Publication Data
US 2016/0230062 A1    Aug. 11, 2016

(51) Int. Cl.
*C09K 8/035* (2006.01)
*E21B 41/00* (2006.01)
(Continued)

(52) U.S. Cl.
CPC ............. *C09K 8/035* (2013.01); *C09K 8/518* (2013.01); *C09K 8/52* (2013.01); *C09K 8/5755* (2013.01);
(Continued)

(58) Field of Classification Search
CPC ..... E21B 41/0064; E21B 43/16; C09K 8/035; C09K 8/518
(Continued)

(56) References Cited

U.S. PATENT DOCUMENTS

2005/0121200 A1    6/2005 Sivaraman
2010/0196104 A1    8/2010 Constantz et al.
(Continued)

FOREIGN PATENT DOCUMENTS

WO    2015026328 A1    2/2015

OTHER PUBLICATIONS

Patel, Unprecedented high-temperature CO2 selectivity in N2-phobic nanoporous covalent organic polymers, Nature Communications (2013).*

(Continued)

*Primary Examiner* — Doug Hutton, Jr.
*Assistant Examiner* — Ashish Varma
(74) *Attorney, Agent, or Firm* — McDermott Will & Emery LLP

(57) ABSTRACT

Carbon dioxide generation in a subterranean formation can be problematic for a number of reasons. Accordingly, it can be desirable to sequester at least a portion of the carbon dioxide that may be present in a subterranean formation, thereby decreasing a quantity of free carbon dioxide. Methods for sequestering carbon dioxide can comprise: providing a $CO_2$-sequestering polymer, the $CO_2$-sequestering polymer sequestering carbon dioxide more readily than it does nitrogen; introducing the $CO_2$-sequestering polymer into a subterranean formation that contains carbon dioxide; and interacting the $CO_2$-sequestering polymer with the carbon dioxide in the subterranean formation, so as to decrease a quantity of free carbon dioxide that is present in the subterranean formation.

17 Claims, 2 Drawing Sheets

(51) Int. Cl.
*C09K 8/518* (2006.01)
*C09K 8/594* (2006.01)
*C09K 8/70* (2006.01)
*C09K 8/94* (2006.01)
*C09K 8/52* (2006.01)
*C09K 8/575* (2006.01)
*C09K 8/62* (2006.01)
*C09K 8/74* (2006.01)
*E21B 43/16* (2006.01)

(52) U.S. Cl.
CPC ............... *C09K 8/594* (2013.01); *C09K 8/62* (2013.01); *C09K 8/703* (2013.01); *C09K 8/74* (2013.01); *C09K 8/94* (2013.01); *E21B 41/0064* (2013.01); *E21B 43/16* (2013.01); *E21B 43/164* (2013.01); *Y02C 10/14* (2013.01)

(58) Field of Classification Search
USPC ........................................................ 166/300
See application file for complete search history.

(56) References Cited

U.S. PATENT DOCUMENTS

| | | |
|---|---|---|
| 2011/0030957 A1 | 2/2011 | Constantz et al. |
| 2011/0033239 A1 | 2/2011 | Constantz et al. |
| 2011/0116998 A1 | 5/2011 | Van Straelen |
| 2011/0297381 A1* | 12/2011 | Code .................. C05D 9/00 166/307 |
| 2012/0055674 A1 | 3/2012 | Sweatman et al. |
| 2012/0275987 A1 | 11/2012 | Hiza et al. |
| 2012/0279728 A1 | 11/2012 | Northrop et al. |
| 2013/0068462 A1* | 3/2013 | Pantano .................. E21B 43/25 166/305.1 |
| 2013/0181843 A1* | 7/2013 | Moghaddamnia ...... E21B 47/18 340/853.1 |

OTHER PUBLICATIONS

International Search Report and Written Opinioin for PCT/US2013/055772 dated May 23, 2014.

* cited by examiner

METHODS AND SYSTEMS FOR SEQUESTERING CARBON DIOXIDE IN A SUBTERRANEAN FORMATION

BACKGROUND

The present disclosure generally relates to carbon dioxide sequestration, and, more specifically, to methods for decreasing the quantity of free carbon dioxide that is present within a subterranean formation.

Carbon dioxide sequestration has recently been the subject of intense research and development activities in a number of fields, primarily due to its environmental impacts as a greenhouse gas. In this regard, significant pressure has been placed on various industries to decrease their carbon dioxide emissions in order to address the effects of global warming and ocean acidification. However, decreased carbon dioxide levels can be beneficial in a number of other applications.

A number of approaches have been implemented for capturing carbon dioxide from industrial processes before it reaches the atmosphere. These approaches can rely upon physical scrubbing of the carbon dioxide with a substrate or upon a chemical reaction that transforms the carbon dioxide into another form, so that it is more easily stored than a carbon dioxide gas. Chemical approaches can involve the reaction of carbon dioxide with ethanolic aqueous amine solutions or with metal cations. The captured carbon dioxide in the reaction product can subsequently be released, if desired, but the release process can be energy intensive and expensive. Physical scrubbing processes can involve the physical adsorption of carbon dioxide to the substrate. However, low adsorption capacities and limited selectivity for adsorption of carbon dioxide over other gases can hinder this approach. In many cases, adsorption selectivity to a substrate can decrease with increasing temperature, which can make this approach problematic for many industrial processes in which carbon dioxide is produced.

Carbon dioxide can originate in a subterranean formation from various sources. Downhole sources of carbon dioxide can include, for example, dissolution of carbonate minerals or carbonate scales with an acid. In some cases, carbon dioxide can be injected into a subterranean formation as a non-aqueous fracturing fluid or as a pressurizing fluid in enhanced oil recovery operations. Carbon dioxide can also be used to foam a treatment fluid that is introduced into a subterranean formation.

Although carbon dioxide can sometimes be intentionally introduced into a subterranean formation to produce one or more beneficial effects therein, there are certain instances in which the presence of carbon dioxide in a subterranean formation can be problematic. For example, when conducting an acidizing operation in a subterranean formation, the presence of excessive carbon dioxide can be especially problematic. One reason that the presence of excessive carbon dioxide can be problematic is due to its equilibrium with bicarbonate/carbonic acid in aqueous fluids. An exemplary reaction is shown in Formula 1 below that demonstrates the reaction of calcite (calcium carbonate) with hydrochloric acid in which this equilibrium is present.

$$CaCO_3 + 2HCl \rightarrow CaCl_2 + H_2CO_3 \leftrightarrow H_2O + CO_2 \quad \text{(Formula 1)}$$

The buffering effect produced by carbonic acid/bicarbonate can have significant implications during an acidizing operation in which a carbonate material is being dissolved. Namely, even if the acid completely spends in dissolving the carbonate material, the aqueous fluid can still have a pH of around 5 due to the buffering effect. Moreover, the presence of significant quantities of carbon dioxide can drive the equilibrium position of the reaction in the reverse direction, thereby slowing the dissolution of the carbonate material with the acid. In addition, the equilibrium induced by the presence of carbon dioxide can lower the effective concentration of the acid that brings about dissolution of the carbonate material.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

Figure 1:
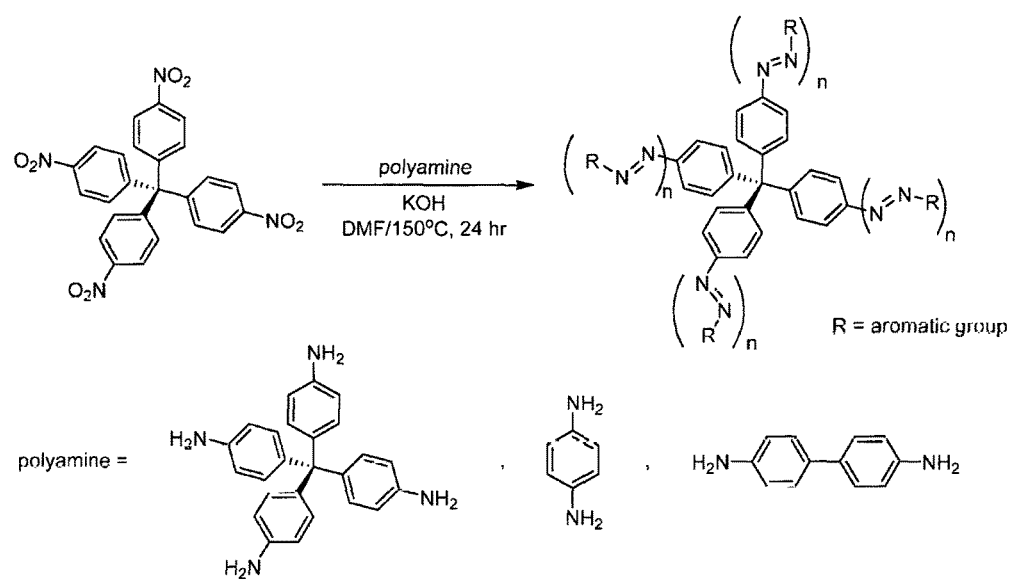
FIG. 1 shows an illustrative synthesis procedure for azo-linked aromatic polymers according to one or more embodiments described herein.

The present disclosure generally relates to carbon dioxide sequestration, and, more specifically, to methods for decreasing the quantity of free carbon dioxide that is present within a subterranean formation.

One or more illustrative embodiments incorporating the disclosure herein are presented below. Not all features of an actual implementation are described or shown in this application for the sake of clarity. It is to be understood that in the development of a physical embodiment incorporating the present disclosure, numerous implementation-specific decisions must be made to achieve the developer's goals, such as compliance with system-related, business-related, government-related and other constraints, which vary by implementation and from time to time. While a developer's efforts might be complex and time-consuming, these such efforts would be, nevertheless, a routine undertaking for one having ordinary skill in the art and with the benefit of this disclosure.

As discussed above, current approaches for sequestering carbon dioxide (such as physical scrubbing and/or chemical reactions) may present difficulties that can limit their applicability in various situations. These difficulties can be especially problematic for the sequestration and potential removal of carbon dioxide from a subterranean formation, due to the conditions that may present downhole and the particular issues that may need to be considered when working in a subterranean environment. For example, temperatures in excess of 100° F. may be present downhole, and such temperatures have the potential to impact the selectivity for carbon dioxide sequestration and/or reaction. In addition, some chemical approaches for sequestering carbon dioxide may be incompatible with the downhole environment and possibly lead to formation damage. Thus, the potential for formation damage and the possible need for conducting remediation operations may need to be weighed against any potential benefits that may be gained by sequestering carbon dioxide and removing it from a subterranean formation.

The present inventors have recognized that the certain organic polymers possess a number of features that may be beneficial for sequestering carbon dioxide in a subterranean formation, as discussed in more detail hereinbelow. Specifically, in addition to their high selectivity ratios for sequestering carbon dioxide, these polymers have a nanoporous structure and accompanying high surface area that leads to their ability to sequester large amounts of carbon dioxide per unit mass. Moreover, the polymers have excellent thermal stability up to about 350° C. in air and in boiling water, thereby making them compatible with conditions that are commonly encountered in subterranean formations. Finally, the polymers' selectivities for sequestering carbon dioxide surprisingly increase with increasing temperature, in contrast to the behavior seen with other types of carbon dioxide adsorption techniques, thereby making the polymers further amenable for downhole carbon dioxide sequestration. Polymers dial may be suitable for use in the embodiments herein are described in further detail below.

By sequestering carbon dioxide in a subterranean formation using the polymers described herein, a number of advantages may be realized during an acidizing operation. First, by decreasing quantities of free carbon dioxide, the equilibrium dissolution of a carbonate material by an acid can be driven in the forward direction, thereby leading to a more rapid dissolution taking place. Second, by driving the equilibrium forward, lower acid concentrations may be used to bring about dissolution of the carbonate material. Lower strength organic acids may also be used to accomplish the dissolution instead of more aggressive mineral acids. Thus, by sequestering carbon dioxide during an acidizing operation, the effective acid strength may be increased. The use of less aggressive or lower concentration acids may beneficially reduce corrosion of tools, tubulars and the like. Third, by sequestering carbon dioxide and driving the equilibrium reaction forward, the buffering effect can be minimized, such that a produced fluid from the acidizing operation is much closer to neutral pH. Finally, by producing the polymers from a subterranean formation following carbon dioxide sequestration, the carbon dioxide may be irreversibly removed from the subterranean environment. After producing the polymers, the carbon dioxide may subsequently be released therefrom to reactivate the polymers for further carbon dioxide sequestration, if desired.

As an additional advantage, since the polymers referenced above have high selectivities for sequestering carbon dioxide over other gases, they may be introduced to a subterranean formation without providing a specialized atmosphere to prevent unwanted sequestration of other gases. For example, in some embodiments, the polymers may be introduced to a subterranean formation under an ambient atmosphere (i.e., the earth's atmosphere). Moreover, since the polymers are highly selective for sequestering carbon dioxide over other gases, they may be introduced to the subterranean formation in a foamed fluid, including a fluid foamed with nitrogen gas, for example. Other gases, including inert gases and natural gas, for example, may also be used in a similar manner to form a foamed fluid in which the polymer is present. Other fluids such as aqueous or non-aqueous fluids, which may be gelled or ungelled, may also be used to introduce the polymers into a subterranean formation. Given the benefit of the present disclosure, one having ordinary skill in the art will be able to determine an appropriate fluid phase for introduction of the polymer to a subterranean formation.

As used herein, the terms "sequester," "sequestered," "sequestering" and other grammatical variants thereof refer to the removal of free carbon dioxide from a medium and placement of the carbon dioxide in a bound state. The bound state can comprise either a physical interaction or a chemical bond.

As used herein, the term "free carbon dioxide" refers to carbon dioxide or an equilibrium product thereof that is present in unbound form in a medium.

As used herein, the term "$CO_2$-sequestering polymer" refers to a polymer that can affect removal of free carbon dioxide from a medium and storage of the carbon dioxide within the polymer. As used herein, the term "polymer" refers to both homopolymers containing one type of monomer unit and copolymers containing more than one type of monomer unit.

As used herein, the term "carbon dioxide to nitrogen sequestration selectivity ratio" refers to the amount of carbon dioxide uptaken by a $CO_2$-sequestering polymer relative to the amount of nitrogen uptaken under like conditions.

As used herein, the term "carbonate material" refers to a substance that comprises a carbonate anion. The carbonate material may comprise a carbonate mineral such as calcite, dolomite, or any combination thereof. In some instances, a carbonate material may be co-present with a siliceous material. As used herein, the term "siliceous material" refers to a substance having the characteristics of silica, including silicates and/or aluminosilicates. Most sandstone formations, for example, contain about 40% to about 98% sand quartz particles (i.e., silica), bonded together by various amounts of cementing materials, which may be siliceous in nature (e.g., aluminosilicates or other silicates) or non-siliceous in nature (e.g., carbonates, such as calcite).

In some embodiments, methods described herein may comprise: providing a $CO_2$-sequestering polymer, the $CO_2$-sequestering polymer sequestering carbon dioxide more readily than it does nitrogen; introducing the $CO_2$-sequestering polymer into a subterranean formation that contains carbon dioxide; and interacting the $CO_2$-sequestering polymer with the carbon dioxide in the subterranean formation, so as to decrease a quantity of free carbon dioxide that is present in the subterranean formation.

In some embodiments, interacting the $CO_2$-sequestering polymer with the carbon dioxide may comprise physically adsorbing the carbon dioxide to the $CO_2$-sequestering polymer. In other embodiments, interacting the $CO_2$-sequestering polymer with the carbon dioxide may comprise forming a chemical bond between the carbon dioxide and the $CO_2$-sequestering polymer.

The source of carbon dioxide in the subterranean formation is not believed to be particularly limited. In some embodiments, the subterranean formation can contain a carbonate material, and the carbon dioxide can be formed by introducing an acid to the subterranean formation and reacting the acid with the carbonate material. That is, in some embodiments, the carbon dioxide may be formed in the subterranean formation by acidizing the subterranean formation. In some embodiments, the subterranean formation may comprise a carbonate formation and contain a carbonate mineral such as calcite, dolomite, or any combination thereof. In some or other embodiments, the subterranean formation may comprise a siliceous formation that contains a siliceous mineral that is co-present with a carbonate mineral. For example, in some embodiments, the siliceous formation may comprise a sandstone formation or a clay formation in which calcite and/or dolomite is also present. In some instances, it may be desirable to interact a carbonate mineral with an acid in order to affect its dissolution before interacting a siliceous mineral with hydrofluoric acid or a hydrofluoric acid-generating compound in order to affect its dissolution. For example, as described in commonly owned U.S. patent application Ser. No. 13/893,747, filed on May 14, 2013 and incorporated herein by reference in its entirety, such approaches may involve using a chelating agent to sequester a metal ion (e.g., a $Ca^{2+}$ ion) released from a dissolved carbonate mineral before the metal ion can form a damaging precipitate in the presence of hydrofluoric acid (e.g., $CaF_2$). In some embodiments, the carbonate material being reacted with the acid in the subterranean formation may comprise a carbonate scale.

Suitable $CO_2$-sequestering polymers for use in the embodiments described herein may have the structure shown in Formula 2 below.

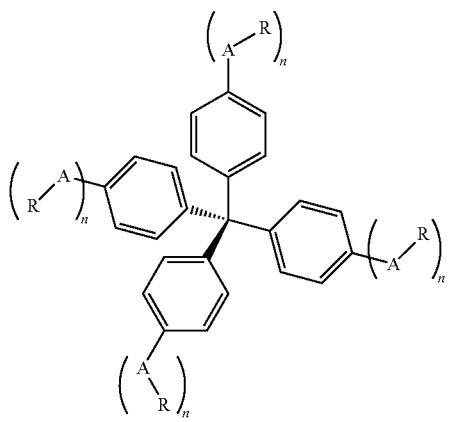

(Formula 2)

In Formula 2, A is a linker moiety, R is an aromatic group, and n is a whole number that is greater than or equal to 1. Suitable linker moieties generally may have two atoms linking the 1,4-phenylene group to aromatic group R, although one-atom and three-atom linker moieties may be used in some embodiments. Two-atom linker moieties (A) may include, for example, —N=N—, —C(=O)NH—, —C(=O)O—, —CH=CH—, —C≡C—, —OCH$_2$—, —NHCH$_2$—, —N=CH—, and 1,2-phenylene. Linker moieties (A) that contain double bonds may be present in a cis or trans configuration. In some embodiments, a —N=N— or —CH=CH— linker moiety may be present in a trans configuration in the $CO_2$-sequestering polymers. Asymmetrical linker moieties may be configured with either atom of the linker moiety bonded to aryl group R. Suitable examples of aryl group R may be selected from the group consisting of those shown in Formulas 3-5 below.

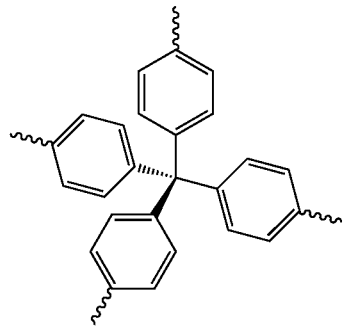

(Formula 3)

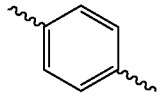

(Formula 4)

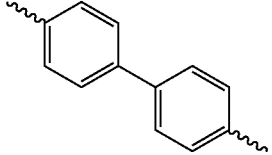

(Formula 5)

In some embodiments, the $CO_2$-sequestering polymer may comprise an azo-linked aromatic polymer. In some embodiments, the azo-linked aromatic polymer may comprise the polymer of Formula 2 in which A is —N=N— and R and n are defined as above. Particularly, in some embodiments, A may be —N=N— and R may be selected from the aromatic groups of Formulas 3-5. Such azo-linked aromatic polymers may be readily synthesized from simple starting materials, which may be inexpensive and commercially available. FIG. 1 shows an illustrative synthesis procedure for azo-linked aromatic polymers according to one or more embodiments described herein.

In some embodiments, the $CO_2$-sequestering polymer may have a carbon dioxide to nitrogen sequestration selectivity ratio of at least about 20:1 within a temperature range of about $-10°$ C. to about $50°$ C. In some embodiments, the carbon dioxide to nitrogen sequestration selectivity ratio of the $CO_2$-sequestering polymers may increase with increasing temperature. Without being bound by any theory or mechanism, it is believed that the nitrogen atoms of the azo linker moiety in azo-linked aromatic polymers may account for their very selective uptake of carbon dioxide over nitrogen.

In some embodiments, the $CO_2$-sequestering polymer may have a pore size ranging between about 0.5 nm and about 100 nm. That is, the $CO_2$-sequestering polymer may comprise a nanoporous polymer. In more particular embodiments, the $CO_2$-sequestering polymer may have a pore size ranging between about 0.5 nm and about 5 nm, or between about 0.5 nm and about 2 nm, or between about 0.5 nm and about 1 nm. The small pore sizes of the $CO_2$-sequestering polymers may lead to a high polymer surface area. In some embodiments, the BET surface area of the $CO_2$-sequestering polymer may be as high as about 729 $m^2/g$.

In some embodiments, methods described herein may comprise: providing a $CO_2$-sequestering polymer that comprises an azo-linked aromatic polymer; introducing a fluid phase comprising the $CO_2$-sequestering polymer into a subterranean formation that contains a carbonate material; introducing an acid into the subterranean formation; reacting the acid with the carbonate material to form carbon dioxide in the subterranean formation; and interacting the $CO_2$-sequestering polymer with the carbon dioxide in the subterranean formation, so as to decrease a quantity of free carbon dioxide that is present in the subterranean formation.

In some embodiments, a fluid phase in which the $CO_2$-sequestering polymer is present may comprise a treatment fluid. Treatment fluids can be used in a variety of subterranean treatment operations. Such treatment operations can include, without limitation, drilling operations, stimulation operations, production operations, remediation operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or a component thereof, unless otherwise specified herein. More specific examples of illustrative treatment operations can include drilling operations, fracturing operations, gravel packing operations, acidizing operations, scale dissolution and removal operations, sand control operations, consolidation operations, and the like.

Generally, the quantity of the $CO_2$-sequestering polymer in a fluid phase should be sufficient to sequester a desired amount of carbon dioxide that may be present in a subterranean formation under a particular set of formation conditions. In various embodiments, the concentration of the $CO_2$-sequestering polymer in the fluid phase may range between about 1% to about 50% of the fluid phase by weight. In some embodiments, the concentration of the $CO_2$-sequestering polymer may range between a lower limit of about 1%, 2%, 5%, 7%, 10%, 12%, or 15% and an upper limit of about 20%, 18%, 15%, 12%, 10%, 7% 5%, or 2% and wherein the concentration of $CO_2$-sequestering polymer may range from any lower limit to any upper limit and encompass any subset between the upper and lower limits. Some of the lower limits listed above are greater than some of the listed upper limits, one skilled in the art will recognize that the selected subset will require the selection of an upper limit in excess of the selected lower limit.

In some embodiments, the fluid phase in which the $CO_2$-sequestering polymer is present may comprise an aqueous fluid as a continuous fluid phase. Suitable aqueous fluids may include, for example, fresh water, acidified water, salt water, seawater, brine (e.g., a saturated salt solution), or an aqueous salt solution (e.g., a non-saturated salt solution). Aqueous fluids may be obtained from any suitable source. Given the benefit of the present disclosure, one of ordinary skill in the art will be able to determine a suitable aqueous fluid for utilization in the embodiments described herein.

In some or other embodiments, the fluid phase in which the $CO_2$-sequestering polymer is present may comprise a non-aqueous fluid, which may comprise an aqueous-miscible fluid, an oil-in-water emulsion, a water-in-oil emulsion, or any combination thereof. Suitable aqueous-miscible fluids may include, for example, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), and polyols.

In some or other embodiments, the fluid phase in which the $CO_2$-sequestering polymer is present may comprise an organic-miscible fluid, such as oil-based fluid. Suitable oil-based fluids may include alkanes, olefins, aromatic hydrocarbons, cyclic alkanes, paraffins, diesel fluids, mineral oils, desulfurized hydrogenated kerosenes, and any combination thereof.

In some embodiments, the fluid phase in which the $CO_2$-sequestering polymer is present may be foamed. That is, in some embodiments, the $CO_2$-sequestering polymer may be introduced into the subterranean formation in a foamed fluid. As used herein, the term "foam" refers to a two-phase composition having a continuous liquid phase and a discontinuous gas phase. The foamed fluid in which the $CO_2$-sequestering polymer may be present may be foamed with any suitable gas, which may include, for example, nitrogen, natural gas (i.e., methane), or one or more inert gases (i.e., helium, neon, argon, krypton, and xenon). In some embodiments, the foamed fluid may be foamed with nitrogen, which is made possible by the high carbon dioxide to nitrogen sequestration selectivity ratios of the $CO_2$-sequestering polymers presented herein. In some embodiments, the quality of the foamed fluid may range from a lower limit of about 5%, 10%, 25%, 40%, 50%, 60%, or 70% gas volume to an upper limit of about 95%, 90%, 80%, 75%, 60%, or 50% gas volume. In more particular embodiments, the foamed fluid may have a foam quality from about 85% to about 95% gas volume, or from about 90% to about 95% gas volume.

In some embodiments, a foaming agent may be used in conjunction with forming a foamed fluid. Suitable foaming agents for use in conjunction with the embodiments described herein may include, for example, cationic foaming agents, anionic foaming agents, amphoteric foaming agents, nonionic foaming agents, or any combination thereof. Non-limiting examples of suitable foaming agents may include, for example, surfactants such as betaines, sulfated or sulfonated alkoxylates, alkyl quarternary amines, alkoxylated linear alcohols, alkyl sulfonates, alkyl aryl sulfonates, C10-C20 alkyldiphenyl ether sulfonates, polyethylene glycols, ethers of alkylated phenols, sodium dodecylsulfate, alpha olefin sulfonates such as sodium dodecylsulfonate, trimethylhexadecyl ammonium bromide, and the like. Foaming agents may be included in a foamed fluid at a concentration typically ranging between about 0.05% to about 2% of the liquid component by weight.

In more particular embodiments, the $CO_2$-sequestering polymer may be used in conjunction with an acidizing operation. The acidizing operation may involve reacting a carbonate material in a subterranean formation with an acid in order to affect at least partial dissolution of the carbonate material. The $CO_2$-sequestering polymer may be introduced to the subterranean formation before the add is introduced to the subterranean formation, at the same time the acid is being introduced to the subterranean formation, after introducing the acid to the subterranean formation, or any combination thereof. When the acid and the $CO_2$-sequestering polymer are being introduced to the subterranean formation at the same time, the acid may be present in a fluid phase in which the $CO_2$-sequestering polymer is present, or the acid and the $CO_2$-sequestering polymer may be added to the subterranean formation from separate fluid phases (i.e., on-the-fly). A fluid phase containing both the $CO_2$-sequestering polymer and an acid may be used in matrix acidizing operations (i.e., below the fracture gradient pressure of the subterranean formation) or fracture-acidizing operations (i.e., above the fracture gradient pressure of the subterranean formation). Given the benefit of the present disclosure and the understanding of one having ordinary skill in the art, one will be able to readily determine whether to introduce a fluid phase to a subterranean formation at matrix flow rates (i.e., below the fracture gradient pressure) or at fracturing flow rates (i.e., at or above the fracture gradient pressure).

Acids that may be used in conjunction with the embodiments described herein are not believed to be particularly limited. As described above, an acid may be reacted with a carbonate material, which can comprise a carbonate scale in some embodiments, to produce carbon dioxide. In some embodiments, the acid may comprise a mineral acid. Suitable mineral acids can include, for example, hydrochloric acid, hydrobromic acid, and the like. In some embodiments, hydrofluoric acid may be used, particularly when acidizing a siliceous formation that also contains a carbonate material. In other embodiments, the acid may comprise an organic acid. Suitable organic acids can include, for example, formic acid, acetic acid, methanesulfonic acid, and the like. Any combination of mineral acids and organic acids may also be used. In some embodiments, acid-generating compounds may be used in a like manner. Examples of suitable acid-generating compounds that may be used in some embodiments described herein include, for example, esters, aliphatic polyesters, orthoesters, poly(orthoesters), poly(lactides), poly(glycolides), poly(ε-caprolactones), poly(hydroxybutyrates), anhydrides, poly(anhydrides), ethylene glycol monoformate, ethylene glycol diformate, diethylene glycol diformate, glyceryl monoformate, glyceryl diformate, glyceryl triformate, triethylene glycol diformate, and formate esters of pentaerythritol.

Chelating acids may be used in some embodiments, either alone or in combination with a mineral acid or an organic acid, to affect dissolution of a carbonate material. Illustrative chelating acids may include, for example, ethylenediaminetetraacetic acid (EDTA), propylenediaminetetraacetic acid (PDTA), nitrilotriacetic acid (NTA), N-(2-hydroxyethyl)ethylenediaminetriacetic acid (HEDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediaminedi(o-hydroxyphenylacetic) acid (EDDHA), acid (GLDA), methylglycine diacetic acid (MGDA), β-alanine diacetic acid (β-ADA), ethylenediaminedisuccinic acid, S,S ethylenediaminedisuccinic acid (EDDS), iminodisuccinic acid (IDS), hydroxyiminodisuccinic acid (HIDS), polyamino disuccinic acids, N-bis[2-(1,2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1,2-dicarboxyethoxy)ethyl]amine (TCA6), N-bis[2-(carboxymethoxy)ethyl]glycine (BCA3), N-bis[2-(methylcarboxymethoxy)ethyl]glycine (MCBA3), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N"-disuccinic acid, triethylenetetramine-N,N'"-disuccinic acid, 1,6-hexamethylenediamine-N,N'-disuccinic acid, tetraethylenepentamine-N,N""-disuccinic acid, 2-hydroxypropylene-1,3-diamine N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, and aspartic acid-N-monoacetic acid.

In further embodiments, various other constituents may also be present in a fluid phase in which the $CO_2$-sequestering polymer is present. Additional constituents that may be present in some embodiments described herein include, for example, silica scale control additives, surfactants, gel stabilizers, anti-oxidants, polymer degradation prevention additives, relative permeability modifiers, scale inhibitors, corrosion inhibitors, defoaming agents, antifoaming agents, chelating agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, breakers, friction reducers, bridging agents, viscosifiers, weighting agents, solubilizers, pH control agents (e.g., buffers), hydrate inhibitors, consolidating agents, bactericides, catalysts, clay stabilizers, breakers, delayed release breakers, and the like. Combinations of these additives can be used as well. Given the benefit of the present disclosure, one having ordinary skill in the art will be able to formulate a fluid phase containing a $CO_2$-sequestering polymer that has characteristics suitable for use in a given application.

In some embodiments, the methods described herein may further comprise producing the $CO_2$-sequestering polymer from the subterranean formation, after interacting the $CO_2$-sequestering polymer from the subterranean formation. The $CO_2$-sequestering polymer may be produced from the subterranean formation in a fluid phase that was used to introduce the polymer to the subterranean formation, or in other embodiments, the $CO_2$-sequestering polymer may be co-produced from the subterranean formation with a hydrocarbon resource or other formation fluid. By producing the $CO_2$-sequestering polymer from the subterranean formation after it has interacted with carbon dioxide, overall levels of carbon dioxide present in the subterranean formation may be decreased.

In other embodiments, at least a portion of the $CO_2$-sequestering polymer may be allowed to remain in the subterranean formation after the polymer has interacted with the carbon dioxide. Although leaving the $CO_2$-sequestering polymer in the subterranean formation may be less economical in terms of polymer usage, it may still allow for a desirable decrease of free carbon dioxide levels in the subterranean formation to be realized, even though the overall level of carbon dioxide that is present in the subterranean formation may remain unchanged.

In some embodiments, the methods described herein may further comprise releasing at least a portion of the carbon dioxide from the $CO_2$-sequestering polymer, after producing the $CO_2$-sequestering polymer from the subterranean formation. In some embodiments, the carbon dioxide may be released from the $CO_2$-sequestering polymer by raising temperature above a level at which the carbon dioxide is expelled from the polymer. In other embodiments, the carbon dioxide may be released from the $CO_2$-sequestering polymer by interacting a competitive binder with the $CO_2$-sequestering polymer that preferentially displaces carbon dioxide and becomes bound to the $CO_2$-sequestering polymer. If desired, the released carbon dioxide may be further chemically transformed so that it is not introduced into the atmosphere as a greenhouse gas emission. For example, the released carbon dioxide may be reacted in a conventional carbon dioxide capture process (e.g., reaction with an aqueous ethanolic amine solution), which may be more readily performed outside of the subterranean environment. In other embodiments, the released carbon dioxide may be processed and sold for utilization in various industrial applications. Once carbon dioxide has been released from the $CO_2$-sequestering polymer, the polymer may be re-introduced to the subterranean formation in order to sequester more carbon dioxide therein.

In various embodiments, systems configured for delivering the $CO_2$-sequestering polymers of the present disclosure to a downhole location are described. The systems can be configured to deliver the $CO_2$-sequestering polymers to a downhole location in a fluid phase. In various embodiments, the systems can comprise a pump fluidly coupled to a tubular, the tubular containing a fluid phase comprising a $CO_2$-sequestering polymer having a carbon dioxide to nitrogen sequestration selectivity ratio of at least about 20:1 within a temperature range of about −10° C. to about 50° C. In some embodiments, higher temperatures of up to about 100° C. may also be compatible with $CO_2$ sequestration by the polymer. In some embodiments, the fluid phase being delivered by the systems may further comprise an acid, and the systems may be further configured to deliver a fluid phase comprising an acid.

The pump may be a high pressure pump in some embodiments. As used herein, the term "high pressure pump" will refer to a pump that is capable of delivering a fluid phase downhole at a pressure of about 1000 psi or greater. A high pressure pump may be used when it is desired to introduce the fluid phase to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the fluid phase to the high pressure pump. In such embodiments, the low pressure pump may "step up" the pressure of the fluid phase before it reaches the high pressure pump.

In some embodiments, the systems described herein can further comprise a mixing tank that is upstream of the pump and in which the $CO_2$-sequestering polymer is mixed with the fluid phase to form a treatment fluid. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

Figure 2:
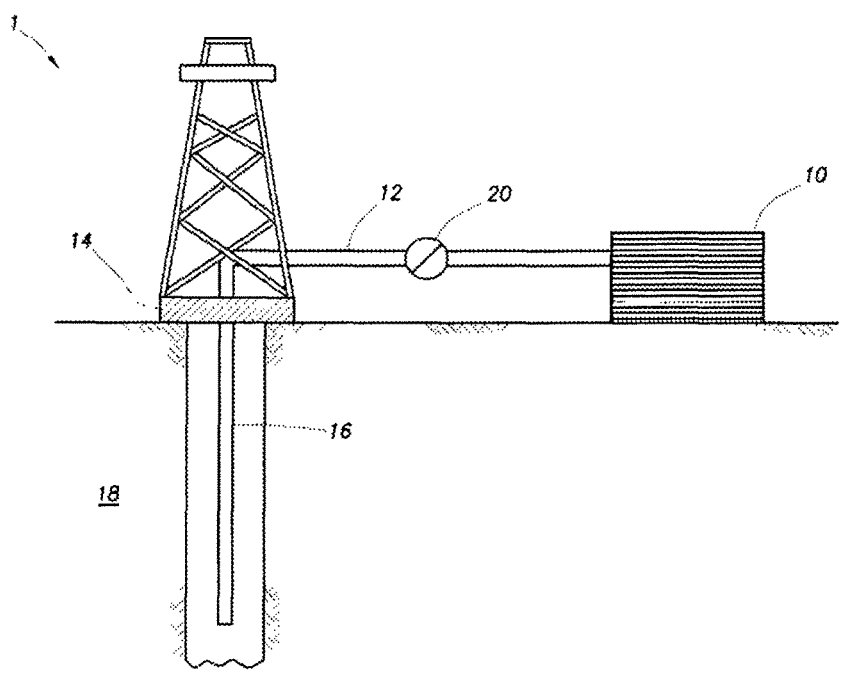
FIG. 2 shows an illustrative schematic of a system that can deliver treatment fluids of the present disclosure to a downhole location, according to one or more embodiments.

FIG. 2 shows an illustrative schematic of a system that can deliver treatment fluids of the present disclosure to a downhole location, according to one or more embodiments. It should be noted that while FIG. 2 generally depicts a land-based system, it is to be recognized that like systems may be operated in subsea locations as well. As depicted in FIG. 2, system 1 may include mixing tank 10, in which a treatment fluid of the present disclosure may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 2 in the interest of clarity. Non-limiting additional components that may be present include, but are not limited to, supply hoppers, valves, condensors, adapters, joints, gauges, sensors, compressors, pressure controllers, pressure sensors, flow rate controllers, flow rate sensors, temperature sensors, and the like.

Although not depicted in FIG. 2, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous Inflow control devices, outtlow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 2.

In some embodiments, methods disclosed herein can comprise: providing a $CO_2$-sequestering polymer, the $CO_2$-sequestering polymer sequestering carbon dioxide more readily than it does nitrogen; introducing the $CO_2$-sequestering polymer into a subterranean formation that contains carbon dioxide; and interacting the $CO_2$-sequestering polymer with the carbon dioxide in the subterranean formation, so as to decrease a quantity of free carbon dioxide that is present in the subterranean formation.

In some embodiments, methods disclosed herein can comprise: providing a $CO_2$-sequestering polymer that comprises an azo-linked aromatic polymer; introducing a fluid phase comprising the $CO_2$-sequestering polymer into a subterranean formation that contains a carbonate material; introducing an acid into the subterranean formation; reacting the acid with the carbonate material to form carbon dioxide in the subterranean formation; and interacting the $CO_2$-sequestering polymer with the carbon dioxide in the subterranean formation, so as to decrease a quantity of free carbon dioxide that is present in the subterranean formation.

In some embodiments, systems described herein can comprise: a pump fluidly coupled to a tubular, the tubular containing a fluid phase comprising a $CO_2$-sequestering polymer having a carbon dioxide to nitrogen sequestration selectivity ratio of at least about 20:1 within a temperature range of about −10° C. to about 50° C.

Embodiments disclosed herein include:

A. Methods for sequestering carbon dioxide in a subterranean formation. The methods can comprise: providing a $CO_2$-sequestering polymer, the $CO_2$-sequestering polymer sequestering carbon dioxide more readily than it does nitrogen; introducing the $CO_2$-sequestering polymer into a subterranean formation that contains carbon dioxide; and interacting the $CO_2$-sequestering polymer with the carbon dioxide in the subterranean formation, so as to decrease a quantity of free carbon dioxide that is present in the subterranean formation.

B. Methods for sequestering carbon dioxide in a subterranean formation. The methods can comprise: providing a $CO_2$-sequestering polymer that comprises an azo-linked aromatic polymer; introducing a fluid phase comprising the $CO_2$-sequestering polymer into a subterranean formation that contains a carbonate material; introducing an acid into the subterranean formation; reacting the acid with the carbonate material to form carbon dioxide in the subterranean formation; and interacting the $CO_2$-sequestering polymer with the carbon dioxide in the subterranean formation, so as to decrease a quantity of free carbon dioxide that is present in the subterranean formation.

C. Systems for treating a subterranean formation. The systems can comprise: a pump fluidly coupled to a tubular, the tubular containing a fluid phase comprising a $CO_2$-sequestering polymer having a carbon dioxide to nitrogen sequestration selectivity ratio of at least about 20:1 within a temperature range of about −10° C. to about 50° C.

Each of embodiments A, B, and C may have one or more of the following additional elements in any combination:

Element 1: wherein the $CO_2$-sequestering polymer has a carbon dioxide to nitrogen sequestration selectivity ratio of at least about 20:1 at a temperature range of about −10° C. to about 50° C.

Element 2: wherein the subterranean formation contains a carbonate material, the carbon dioxide being formed by introducing an acid to the subterranean formation and reacting the acid with the carbonate material.

Element 3: wherein the subterranean formation also contains a siliceous material.

Element 4: wherein the method further comprises producing the $CO_2$-sequestering polymer from the subterranean formation, after interacting the $CO_2$-sequestering polymer with the carbon dioxide.

Element 5: wherein the method further comprises releasing at least a portion of the carbon dioxide from the $CO_2$-sequestering polymer, after producing the $CO_2$-sequestering polymer from the subterranean formation.

Element 6: wherein the $CO_2$-sequestering polymer comprises an azo-linked aromatic polymer.

Element 7: wherein the $CO_2$-sequestering polymer has a structure of

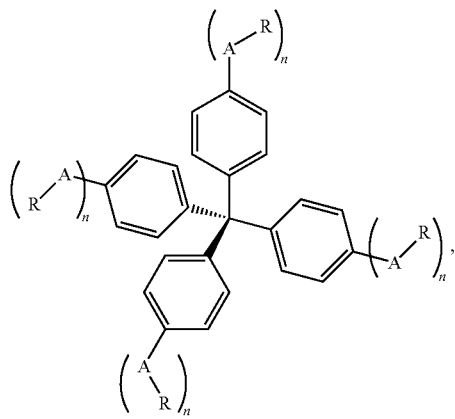

wherein R is an aromatic group, n is a whole number greater than or equal to 1, and A is a linker moiety selected from the group consisting of —N═N—, —C(═O)NH—, —C(═O)O—, —CH═CH—, —C≡C—, —OCH$_2$—, —NHCH$_2$—, —N═CH—, and 1,2-phenylene.

Element 8: wherein A is —N═N— and R is selected from the group consisting of

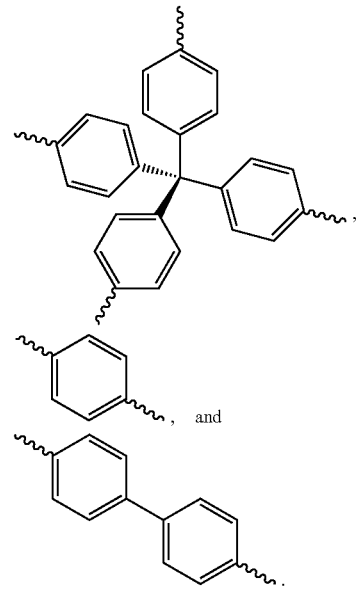

Element 9: wherein the $CO_2$-sequestering polymer is introduced into the subterranean formation in a foamed fluid.

Element 10: wherein the $CO_2$-sequestering polymer is foamed with nitrogen.

Element 11: wherein the acid and the $CO_2$-sequestering polymer are introduced into the subterranean formation at the same time.

Element 12: wherein the acid is present in the fluid phase.

Element 13: wherein the $CO_2$-sequestering polymer is introduced into the subterranean formation before the acid.

By way of non-limiting example, exemplary combinations applicable to A, B, C include:

Combination 1: The method of A or B in combination with element 1.

Combination 2: The method of A or B in combination with element 2.

Combination 3: The method of A or B in combination with element 4.

Combination 4: The method of A or B in combination with element 6.

Combination 5: The method of A or B in combination with element 10.

Combination 6: The method of A or B in combination with elements 1 and 7.

Combination 7: The method of A or B in combination with elements 2 and 7.

Combination 8: The method of A or B in combination with elements 2, 4 and 7.

Combination 9: The method of A or B in combination with elements 4, 5 and 7.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. When "comprising" is used in a claim, it is open-ended. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claim, each numerical parameter should at least be construed in light of the number of reported significant digits and by applying ordinary rounding techniques.

The invention claimed is:

1. A method comprising:
providing a $CO_2$-sequestering polymer, the $CO_2$-sequestering polymer sequestering carbon dioxide more selectively than it does nitrogen;
introducing the $CO_2$-sequestering polymer into a subterranean formation that contains carbon dioxide; and
interacting the $CO_2$-sequestering polymer with the carbon dioxide in the subterranean formation, so as to decrease a quantity of free carbon dioxide that is present in the subterranean formation by sequestering the free carbon dioxide with the $CO_2$-sequestering polymer,
producing the $CO_2$-sequestering polymer from the subterranean formation, after interacting the $CO_2$-sequestering polymer with the carbon dioxide, and
releasing at least a portion of the carbon dioxide from the $CO_2$-sequestering polymer, after producing the $CO_2$-sequestering polymer from the subterranean formation.

2. The method of claim 1, wherein the $CO_2$-sequestering polymer has a carbon dioxide to nitrogen sequestration selectivity ratio of at least about 20:1 within a temperature range of about −10° C. to about 50° C.

3. The method of claim 1, wherein the subterranean formation contains a carbonate material, the carbon dioxide being formed by introducing an acid to the subterranean formation and reacting the acid with the carbonate material.

4. The method of claim 3, wherein the subterranean formation also contains a siliceous material.

5. The method of claim 3, wherein the carbonate material comprises a carbonate scale.

6. The method of claim 1, wherein the $CO_2$-sequestering polymer comprises an azo-linked aromatic polymer.

7. The method of claim 1, wherein the $CO_2$-sequestering polymer has a structure of

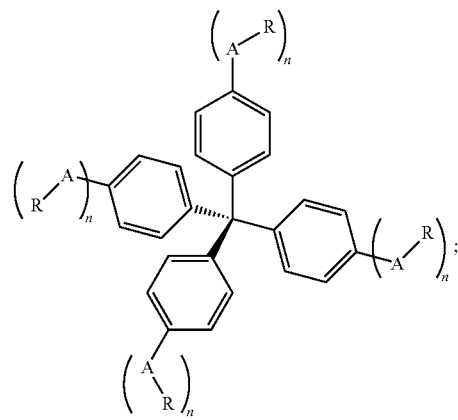

wherein A is a linker moiety selected from the group consisting of —N=N—, —C(=O)NH—, —C(=O)O—, —CH=CH—, —C≡C—, —OCH$_2$—, —NHCH$_2$—, —N=CH—, and 1,2-phenylene;
wherein R is an aromatic group; and
wherein n is a whole number greater than or equal to 1.

8. The method of claim 7, wherein A is —N=N— and R is selected from the group consisting of

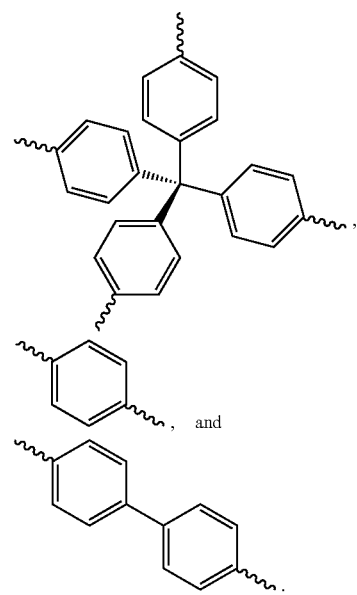

9. The method of claim 1, wherein the $CO_2$-sequestering polymer is introduced into the subterranean formation in a foamed fluid.

10. The method of claim 9, wherein the foamed fluid is foamed with nitrogen.

11. A method comprising:
providing a $CO_2$-sequestering polymer that comprises an azo-linked aromatic polymer;
introducing a fluid phase comprising the $CO_2$-sequestering polymer into a subterranean formation that contains a carbonate material;
introducing an acid into the subterranean formation;
reacting the acid with the carbonate material to form carbon dioxide in the subterranean formation; and
interacting the $CO_2$-sequestering polymer with the carbon dioxide in the subterranean formation, so as to decrease a quantity of free carbon dioxide that is present in the subterranean formation by sequestering the free carbon dioxide with the $CO_2$-sequestering polymer,
producing the $CO_2$-sequestering polymer from the subterranean formation, after interacting the $CO_2$-sequestering polymer with the carbon dioxide, and
releasing at least a portion of the carbon dioxide from the $CO_2$-sequestering polymer, after producing the $CO_2$-sequestering polymer from the subterranean formation.

12. The method of claim 11, wherein the $CO_2$-sequestering polymer has a structure of

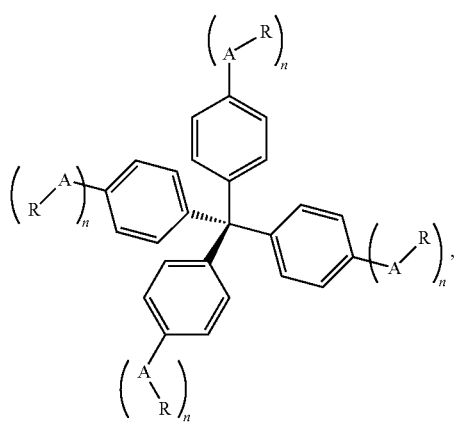

wherein A is —N═N—;

wherein R is an aromatic group; and
wherein n is a whole number greater than or equal to 1.

13. The method of claim 12, wherein R is selected from the group consisting of:

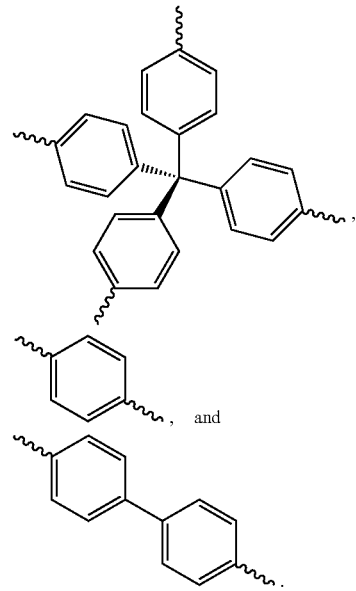

14. The method of claim 11, wherein the acid and the $CO_2$-sequestering polymer are introduced into the subterranean formation at the same time.

15. The method of claim 14, wherein the acid is present in the fluid phase.

16. The method of claim 11, wherein the $CO_2$-sequestering polymer is introduced into the subterranean formation before the acid.

17. The method of claim 11, wherein the $CO_2$-sequestering polymer has a carbon dioxide to nitrogen sequestration selectivity ratio of at least about 20:1 within a temperature range of about −10° C. to about 50° C.

* * * * *